Jan. 15, 1924.

C. A. B. HALVORSON, JR 1,480,904

HIGHWAY ILLUMINATOR

Filed Nov. 19, 1921

2 Sheets-Sheet 1

Inventor:
Cromwell A. B. Halvorson Jr.,
by Albert G. Davis
His Attorney

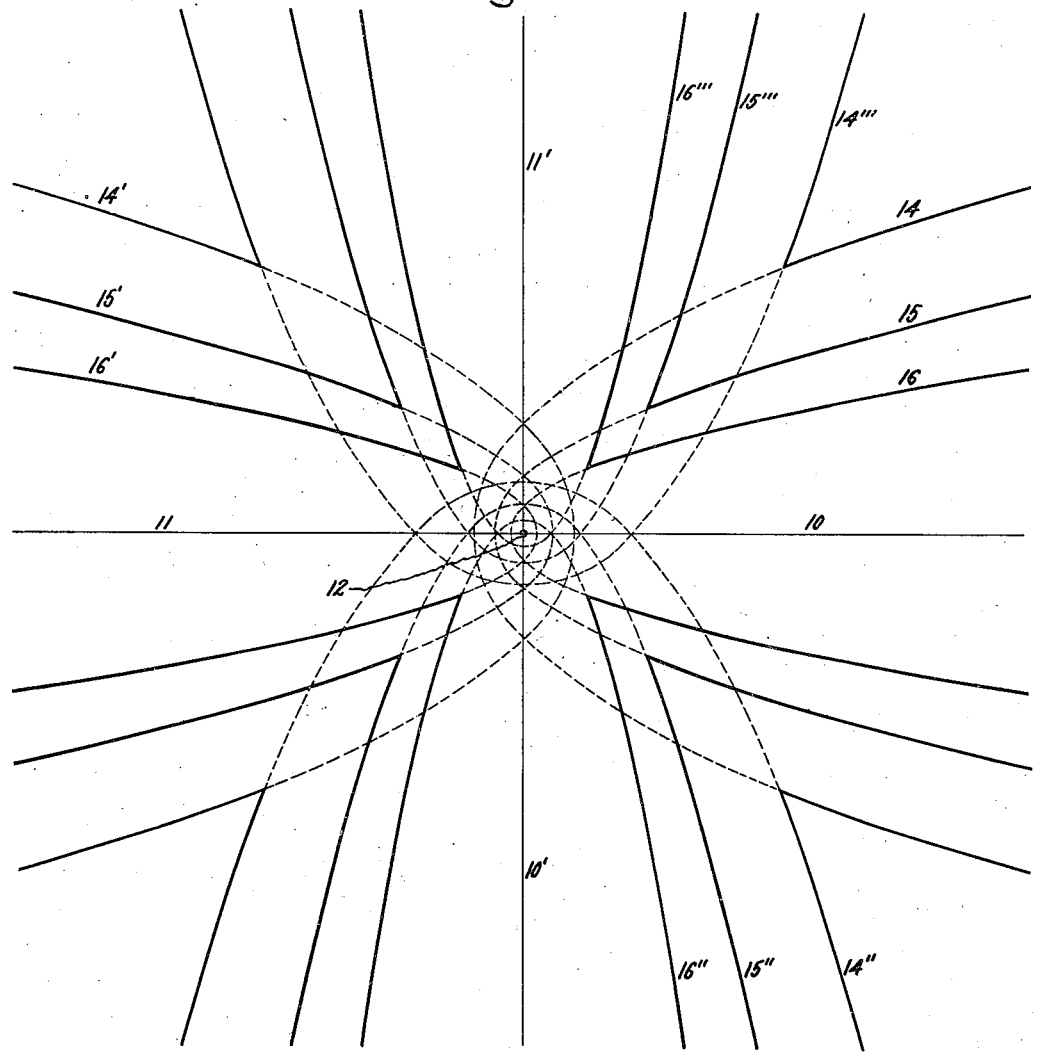

Patented Jan. 15, 1924.

1,480,904

UNITED STATES PATENT OFFICE.

CROMWELL A. B. HALVORSON, JR., OF LYNN, MASSACHUSETTS, ASSIGNOR TO GENERAL ELECTRIC COMPANY, A CORPORATION OF NEW YORK.

HIGHWAY ILLUMINATOR.

Application filed November 19, 1921. Serial No. 516,288.

*To all whom it may concern:*

Be it known that I, CROMWELL A. B. HALVORSON, Jr., a citizen of the United States, residing at Lynn, in the county of Essex, State of Massachusetts, have invented certain new and useful Improvements in Highway Illuminators, of which the following is a specification.

My invention has reference to an improved electric lighting unit, which, although adapted for use in many localities, is specially adapted for outdoor illumination and particularly for the lighting of highways in a manner that effectively avoids glare to the drivers of automobiles or other vehicles and to pedestrians. The fundamental principle of the invention is the division of the light flux from a suitable and rather powerful source into a number of separated annular concentric beams, each beam carrying only a fraction of the light flux from the source, but a number of them forming a set of beams issuing together in a certain restricted general direction with no flux dissipated uselessly or harmfully above or below or, generally, beyond the intended field of illumination. In its practical application for highway lighting, two or more sets of separated concentric beams are preferably used. If only two sets are used, one of them is arranged to illuminate the road substantially in one direction along its axis and the other set to illuminate the road in like manner in the opposite direction. By the subdivision of the light the intensity of each fractional beam is sufficiently moderated to deprive it of glare, while each set of concentric beams carries as much light as one undivided concentrated beam would.

The results above indicated are obtained by a group or groups of paraboloidal reflectors, each group composed of two or more truncated paraboloids having a common axis and focus, but different focal lengths, the vertices of the paraboloids composing a group being all on the same side of the focus and the source of light in the focus. In this manner the paraboloids of each group become nested and means are provided for holding them in the nested relation. When, as in highway or field lighting, two or more groups of nested paraboloids are used, each group has its own axis, but the foci of all groups coincide.

Figure 1:
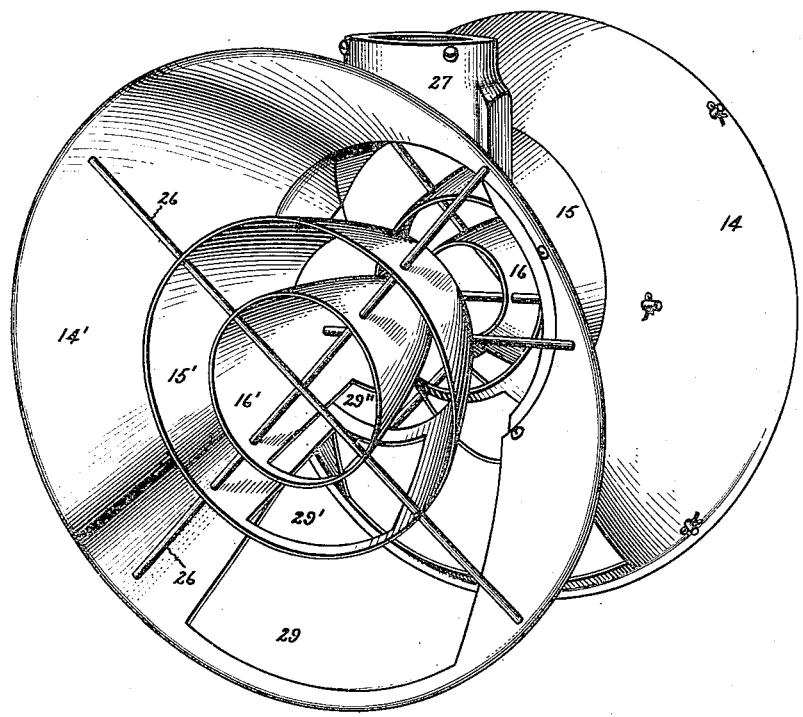
Figure 2:
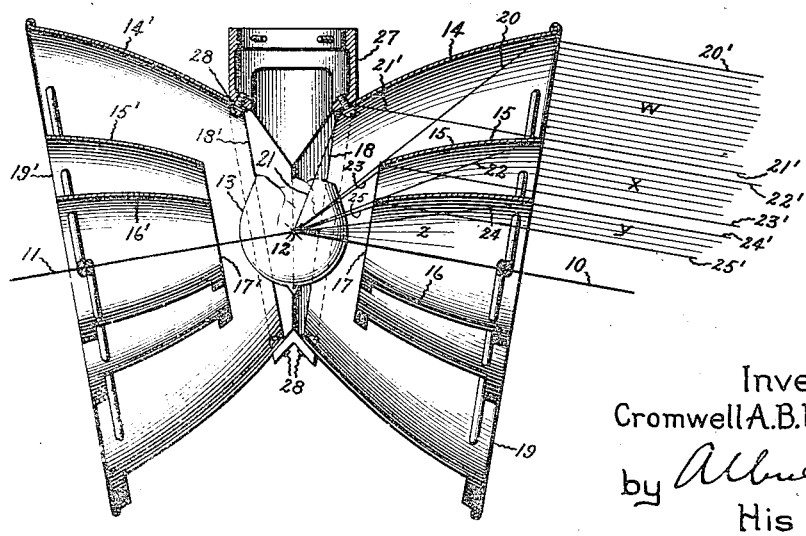

All this will more fully appear from the following detailed description with reference to the accompanying drawings in which Fig. 1 is a perspective view of a highway lighting unit with two groups of nested paraboloids, but with the light source omitted; Fig. 2 is a vertical section in the plane of the axes of the two groups shown in Fig. 1, and with the light source in position; and Fig. 3 is an enlarged diagram showing four groups of paraboloidal reflectors in accordance with the invention.

The two groups of nested, truncated paraboloids are shown in Figs. 1 and 2 with their axes 10, 11 at an obtuse angle. This is the preferred arrangement for highway lighting, but for some purposes and locations the axes may with advantage be horizontal. As here shown the axes intersect at 12, which is the common focus of all paraboloids of the structure and at which the source of light, the concentrated filament of an incandescent lamp 13, is located. In the structure here shown by way of example each group of paraboloidal reflectors is composed of three elements 14, 15, 16 and 14', 15', 16' respectively. The innermost element 16 of the group on the right hand side has the shortest focal distance, so that its vertex, if it were present, would be close to the light source, on the left hand side thereof; the middle element 15 has a somewhat longer focal distance and the outside element 14 has the longest focal distance. The same relation exists between the elementary paraboloids of the left hand group of reflectors, and in practice it is convenient to make the inner, the middle and the outer paraboloids of one group equal to those of the other group, as indicated in the drawing. This, however, is not absolutely necessary but is convenient for the sake of ease of construction.

Each paraboloid is truncated, that is to say, its vertex and a certain portion of the paraboloid extending from the vertex forwardly is cut away as shown, whereby each paraboloidal frustrum is open to the reception on its inner surface of light rays from the source and reflects the same parallel to its axis. As shown in the drawing, by way of example, the pairs of inner paraboloids 15, 16 and 15', 16' are truncated each by one plane, 17 and 17' respectively, while the outermost paraboloids are truncated each by a plane 18 and 18' respectively, which is nearer to the focus. The drawing also shows by way of example the front edges of each cluster in one plane 19 and 19' respectively, but the invention is not limited to this particular arrangement, since the expanse of the paraboloidal frustra may be widely varied, without departing from the spirit of the invention.

The particular choice of the axial length of each frustrum is guided by the consideration that each frustrum should receive and reflect rays from one end to the other, and not permit the free issue of rays from the source into the field of illumination, except through the innermost frustrum, and this result is secured by a suitable relation of the focal lengths of the paraboloids and of the front and rear limits of the frustra. In the example shown in the drawing the focal distances and the lengths of the frustra are chosen with this object in view. The drawing illustrates this with reference to the upper half of the right hand cluster of parabolas represented in Fig. 2, as follows:

The outermost rays 20 which strike the inner surface of the outer edge of reflector 14 just miss the outer face of the inner edge of the reflector 15 and are reflected along 20' parallel to the axis 10. All other points of reflector 14 are free to receive rays from the source, the innermost rays being 21, which are reflected along 21' parallel to the axis 10, and all the rays which strike the reflector 14 at intermediate points are likewise reflected and issue into the field of illumination as an annular circular beam $w$ carrying a fraction only of the light flux from the source and having no glaring effect. The reflecting elements 15 and 16 operate in like manner. Thus the rays 22, which just miss the outer face of the inner edge of the reflector 16, strike the inner face of the outer edge of reflector 15 and are reflected along lines 22', while the rays 23 which strike the inner face of the inner edge of the reflector 15 are reflected along lines 23', and all the intermediary points of reflector 15 receive rays which are reflected parallel to the axis and issue as an annular circular beam $x$. Likewise, rays 24 strike the inner face of the outer edge of reflector 16 and are reflected along lines 24', while the rays 25 which strike the inner face of the inner edge of reflector 16 are reflected along lines 25', all parallel to the axis 10 and thus issuing as an annular circular beam $y$. Each of these beams carries only a fraction of the light flux from the source and has therefore no glaring effect. The space between the outermost rays which strike the inner face of the innermost reflector takes the light flux directly into the field of illumination as a cone $z$, but this light flux is comparatively small and has no glaring effect. If desired, this direct light flux may be dimmed either by frosting a corresponding spot on the bulb 13 or by a small frosted screen placed within the innermost reflector; such arrangement being generally well known in the art. In practice, however, this is found to be unnecessary, because the direct light flux of the cone $z$, is surrounded by the concentric, non-glaring, fractional beams $w$, $x$, $y$, that is to say, it issues from the center of a highly luminous, though not glaring region or background. The same light cone $z$, if it issued from a dark background, might have some glaring effect, but the luminous background prevents such effect. This is in accordance with physiological laws which I have ascertained.

The spacing between the reflecting elements is secured by suitable rods 26 passing diametrically through the nested paraboloids as indicated in the drawing, but in place of these rods any other means of spacing and holding in place the reflecting elements may be employed.

Since the two groups of reflector elements shown in Figs. 1 and 2 are at an obtuse angle to each other, the lowest points of the inner ends of the outermost paraboloids will be rather close together, while from there upwardly a gradually increasing open space is left between the two outer reflectors. This space is closed by a casting 27 suitably formed and secured to the outer reflector by screws 28, or in any suitable manner, and this casting serves for the reception of the bulb of the incandescent lamp in a manner well understood in the art. At the same time it also serves as a means of sustaining the whole lighting unit upon a pole or other support.

In order to introduce the incandescent lamp into the casting 27, which is designed to support it, openings are made in the lower faces of the paraboloids, shown most clearly in Fig. 1. These openings are marked with the numerals 29, 29', 29'', and through them the hand of an attendant may enter and carry the incandescent lamp to its place.

At the same time these openings serve another purpose, namely, the issuing of light from the bulb directly downwardly, so that the place where the unit is mounted is being illuminated, not only immediately below the incandescent bulb, but also to the right and to the left for a short distance.

The total effect of the structure described is that a number of fractional beams are projected along the axis of each group or nest of paraboloids without glare; while at the same time underneath the light unit is a space which is illuminated and marks on the ground the location of the unit, and this illuminated space merges into the spaces illuminated by the concentric beams.

Experience has shown that in this manner, with proper elevation of the unit above the ground end with proper spacing of the units along a highway, the whole highway is effectively illuminated without any obtrusive shadows from place to place. The material of the reflector elements should be such as is not affected by rain or snow, and I have found that sheet iron with a coat of enamel serves this purpose well, but any other suitable material may be used.

While the reflecting elements are preferably shaped as paraboloidal frustra, it is evident that other surfaces of revolution, notably hyperboloids may be used, and that many other modifications of the structure may be used without departing foom my invention.

In the diagram shown in Fig. 3 the axes of the four groups of paraboloids are assumed to be all in the same horizontal plane. This drawing therefore shows the parabolas resulting from a horizontal section through the axes 10, 11 and 10', 11'. The axes 10, 11 are extensions of each other and the axes 10', 11', at right angles to 10, 11, are likewise extensions of each other. The frustra of the parabolas which are actually used as reflectors in this construction are shown in solid lines and the vertex portion of each parabola (which does not enter into the construction of the apparatus) is completed in dotted lines, whereby the geometric relations of the parts is made clear. All these parabolas have their common focus at 12, where the source of light is located. The two groups of parabolas 14, 15, 16 and 14', 15', 16' are here sections of paraboloids for lighting one line of street or road and the two groups 14'', 15'', 16'' and 14''', 15''', 16''' are designed for lighting an intersecting street or road.

It is to be understood that Fig. 3 is not intended to show the exact relative lengths of the paraboloidal frustra, nor the means for holding them in the nested but spaced relation, or the form of casting for connecting the four groups of nests. These features are sufficiently shown or indicated and described with reference to the two groups of nests of Figs. 1 and 2 and may be modified or varied in many ways for adaptation to four groups of nests without departing from the invention. It should also be understood that the axes of the four groups of nests need not be in one plane, since the axes of conjugated pairs of groups may be inclined to each other as shown in Figs. 1 and 2. If such arrangement is adopted, the two axes 10, 11 of one pair of conjugated groups will be in one plane, while the two axes 10', 11' of the other pair of conjugated groups will be in another plane at an angle to the first plane.

In the appended claims the reflectors are specifically noted as paraboloidal frustra, but this term is intended to include any other suitable surfaces of revolution.

What I claim as new and desire to secure by Letters Patent of the United States, is:

1. A lighting unit comprising a number of groups of spaced, nested paraboloidal reflecting frustra, the reflectors of each group having a common axis and different focal distances, the axes of the groups extending in different directions and all reflectors having a common focus, a casting connecting and supporting the groups of reflectors, a concentrated filament incandescent electric lamp removably seated in the casting with the filament in the focus, and openings in the lower faces of the reflectors for insertion and removal of the lamp and for the downward projection of light.

2. A light unit comprising a number of groups of spaced, nested paraboloidal reflecting frustra, the reflectors of each group having common axes and different focal distances, the axes of the groups extending in different directions and being inclined to each other, said reflectors having a common focus, and a source of light at the focus.

3. A highway lighting unit having two sets of nested reflectors, the surface of each reflector being a surface of revolution, the reflectors of each set having a common major axis, the major axes of the two sets inclined to each other, both sets having a common focal point, an electric lamp and a fixture for holding the lamp at the focal point.

4. A highway lighting unit having two sets of nested reflectors, each reflector having a plurality of reflecting surfaces, each surface being a surface of revolution, each nest having a major axis coincident with the major axes of the surfaces thereof, the major axes of each nest inclined to each other and the surfaces of both nests having a common focal point, an electric lamp and a fixture for supporting the lamp at the focal point and for holding the nests together.

5. A highway unit having two sets of reflectors, each reflector having a series of reflecting surfaces, each of which is a surface of revolution, the surfaces in each set having a common major axis, and the major axes of the two sets being inclined to each other, the surfaces of both sets having a common focal point but different focal distances, an electric lamp and a fixture for supporting the lamp at the focal point and for holding the nests together, the fixture being attached to the outside of the unit.

6. A highway unit having two sets of reflectors, each reflector having a series of reflecting surfaces, each of which is a surface of revolution, the surfaces in each set having a common major axis, and the major axes of the two sets being inclined to each other, the surfaces of both sets having a common focal point but different focal distances, an electric lamp and a fixture for supporting the lamp at the focal point and for holding the nests together, the fixture being attached to the outside of the unit, said lamp projecting through the unit and extending from the focal point to the support.

7. In a highway lighting unit, a plurality of reflectors having reflecting surfaces of revolution with coincident major axes and a pair of diverging rods passing through a pair of the surfaces for holding the surfaces separated from each other.

8. A highway lighting unit having two sets of nested reflectors, each reflector having a plurality of reflecting surfaces, each surface being a surface of revolution, each nest having a major axis coincident with the major axes of the surfaces thereof, the major axes of each nest inclined to each other and the surfaces of both nests having a common focal point, an electric lamp and a fixture for supporting the lamp at the focal point and for holding the nests together, the nests coming together along a common frustral plane which passes through the common focal point and which bisects the angle formed by the major axes and which lies perpendicular to a plane through the major axes.

9. A highway lighting unit having two sets of nested frustra reflectors held in juxtaposition along a common frustral plane, each reflector being in the form of a surface of revolution, the reflectors of each set having a common major axis, the major axes of the two sets inclined to each other, the surfaces of both sets having a common focal point, an electric lamp and a fixture for holding said lamp at the focal point, the fixture attached to the unit near the frustral plane.

10. A highway lighting unit having two sets of nested frustra reflectors held in juxtaposition along a common frustral plane, each reflector being in the form of a surface of revolution, the reflectors of each set having a common major axis, the major axes of the two sets inclined to each other, the surfaces of both sets having a common focal point, an electric lamp and a fixture for holding said lamp at the focal point, the fixture attached to the unit near the frustral plane, and a pair of diverging rods for holding the reflecting surfaces in position.

11. A highway lighting unit having two sets of nested reflectors, each reflector having a series of reflecting surfaces, each surface being a surface of revolution, the surfaces in each nest having a common major axis, the major axes inclining to each other, all of the said surfaces of both nests having a common focal point, an electric light lamp and a fixture for said lamp for supporting the lamp at the said focal point, said nests attached to said fixture near their smaller diameters, the inner reflecting surfaces of the nest secured to the outermost reflecting surface by two diverging rods, said rods in sliding engagement with the inner surfaces.

12. A lighting unit comprising a number of groups of spaced nested paraboloidal reflecting frustra, the reflectors of each group having a common axis and different focal distances, the axes of the groups extending in different directions and the reflectors of both groups having a common focus, a casting connecting and supporting the groups of reflectors, an electric lamp seated in the casting and located at the said focus and openings in the surfaces of the reflectors in juxtaposition with each other whereby a beam of light may be radiated through said openings from said lamp.

13. A lighting unit comprising a number of groups of spaced nested paraboloidal reflecting frustra, the reflectors of each group having a common axis and different focal distances, the axes of the groups extending in different directions and inclined to each other, and the reflectors of both groups having a common focus, a casting connecting and supporting the groups of reflectors, an electric lamp seated in the casting and located at the said focus and openings in the surfaces of the reflectors in juxtaposition with each other whereby a beam of light may be radiated through said openings from said lamp.

In witness whereof, I have hereunto set my hand this 17th day of November, 1921.

CROMWELL A. B. HALVORSON, Jr.